United States Patent [19]

Ebina

[11] Patent Number: 5,686,026

[45] Date of Patent: Nov. 11, 1997

[54] PROCESS FOR MANUFACTURING OPTICAL DISCS

[75] Inventor: Toshiyuki Ebina, Tokoname, Japan

[73] Assignee: Meiki Co., Ltd., Ohbu, Japan

[21] Appl. No.: 556,459

[22] Filed: Nov. 15, 1995

[30] Foreign Application Priority Data

Jul. 2, 1995 [JP] Japan ..................... 7-043594

[51] Int. Cl.$^6$ ..................... B29D 11/00
[52] U.S. Cl. ............... 264/1.33; 264/1.38; 264/107; 264/328.16; 425/810; 427/162
[58] Field of Search ..................... 264/1.1, 1.33, 264/106, 107, 328.16, 1.36, 1.38; 156/245; 425/810; 427/162, 163.1

[56] References Cited

U.S. PATENT DOCUMENTS

| | | | |
|---|---|---|---|
| 4,363,844 | 12/1982 | Lewis et al. | 156/245 |
| 5,244,606 | 9/1993 | Maus et al. | 264/1.33 |
| 5,354,517 | 10/1994 | Yamasaki et al. | 264/1.1 |

*Primary Examiner*—Mathieu D. Vargot
*Attorney, Agent, or Firm*—Browdy and Neimark

[57] ABSTRACT

A process of manufacturing the optical discs by injection molding includes compulsive forced cooling of the molded discs, carried out after sputtering to shorten the cooling time in the mold, in consideration of keeping the replication errors in the pits on the molded discs. The process also includes metallizing the surface of the molded discs by sputtering (to make laser beams reflect). UV resin coating for protecting the metallized surface of the discs, and inspecting the pits for replication of information signals quality.

9 Claims, 3 Drawing Sheets

PROCESS FOR MANUFACTURING OPTICAL DISCS

BACKGROUND OF THE INVENTION

1. Field of the Invention

The present invention relates to a process for manufacturing optical discs and particularly concerns a method of cooling the molded discs in the process.

2. Description of the Related Art

The manufacture of optical discs for compact discs and laser discs, etc. (hereinafter called discs) includes all the processes of: injection molding; sputtering metal on the surface of the molded discs to make laser beams reflect from them; applying a UV (Ultra Violet) sensitive resin coating process for protecting the metal surface of the discs; and inspecting the completed discs. Machines and devices for carrying out these processes are known, and such machines may be installed in lines capable of continuously carrying out the above processes.

FIG. 2, labelled "prior art", shows a layout of machines and devices installed in a line capable of carrying out successive prior-art production process of making discs. Disc substrata, on which numerous pits of information signals are replicated, are molded by an injection machine 51 with a mold 52, then molded disc substrata are retained in the mold 52 for a predetermined number of seconds (for example, three or four seconds) for cooling, and then are taken out by a robot 53 from the mold 52.

However, as the molded discs are kept at temperatures higher than about 100° C. until the instant of taking out the molded discs, the molded discs are transferred to a cooling station 54 to be force-cooled rapidly to about 30° C. by blowing cooled air. In order to shorten the cycle time for production of the discs, the cooled discs are successively transferred by a conveyer unit 56 under the control of an operation control box 61 to a sputtering device 55. There, metal to reflect laser rays (for reading the information signals stored in the pits on the molded discs) is sputtered onto a side surface of the molded discs by the sputtering device 55. After completion of sputtering, the molded discs are then transferred by the transfer unit 56 to a coating device 57 to be coated with UV resin over the metal foil. The molded discs, on which the metal surface has been coated with UV resin, are transferred to a UV ray device 58 for curing the UV resin by exposure to UV rays. After curing the UV resin, the molded discs are transferred to an inspecting device 60 with an operation control box 62 to detect faults of appearance and pits on the molded discs.

Shortening of the cycle time has been desired to increase productivity. However, in the case of manufacturing discs according to the above-mentioned layout of the machines and devices, it has been difficult, because of the occurrence of faults of pits on the disc surface, to shorten cooling time of the molded discs in the mold to less than three seconds.

Trials for increasing productivity in the abovementioned prior process were examined, and it was found that the time for cooling the molded discs in the mold is long in proportion to the times of other processes, and could not be shortened to less than three seconds from a quality-control point of view. Thus, an attempt to shorten the cooling time in the mold to less than three seconds in the above prior-art process failed to maintain clear replication of pits on the surface of the molded discs. The reason is that the shorter the time for cooling the molded discs in the mold is, the higher the temperature of the molded discs is at the instant of being ejected from the mold.

It will bring about undesirable results in the replication of the pits on the discs if the disc is taken out too quickly and cooled compulsively and rapidly from high temperature to room temperature at the cooling station 54. For instance, if polycarbonate resin is used for molding and the time for cooling of the discs in the mold is set at 2.5 seconds, the temperature of the molded discs at the instant of being ejected from the mold will fall to about 130° C., due to the cooling control of the mold itself and also to natural cooling of the discs. As the temperature of melted polycarbonate resin falls to 130° C., the viscosity of the resin increases greatly owing to passing to below the Glass Transition range of the resin. Consequently, formation of clear pits on the surface of the discs is prevented. It is necessary, for forming clear pits, to avoid rapid cooling of the molded discs near the glass transition range temperatures.

SUMMARY OF THE INVENTION

Accordingly, the present invention has an object, among others, to overcome deficiencies in the prior art such as noted above.

In light of the above-mentioned problems, it is another object of the present invention to provide a novel process for promotion of productivity in the production of optical discs.

A further object of the present invention is to provide a novel process for reducing cooling time of the molded discs in the mold.

A still further object is to provide a novel process relating to a layout of the machines which take partial charge of each process for manufacturing the discs so as not to damage the clear pits on the surface of the molded discs.

Other objects and features of the invention will be pointed out or will occur to those skilled in the art from a reading of the following specification in conjunction with the accompanying drawings.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

The present invention will be described in further detail by way of example, with reference to the accompanying drawings.

Figure 1:
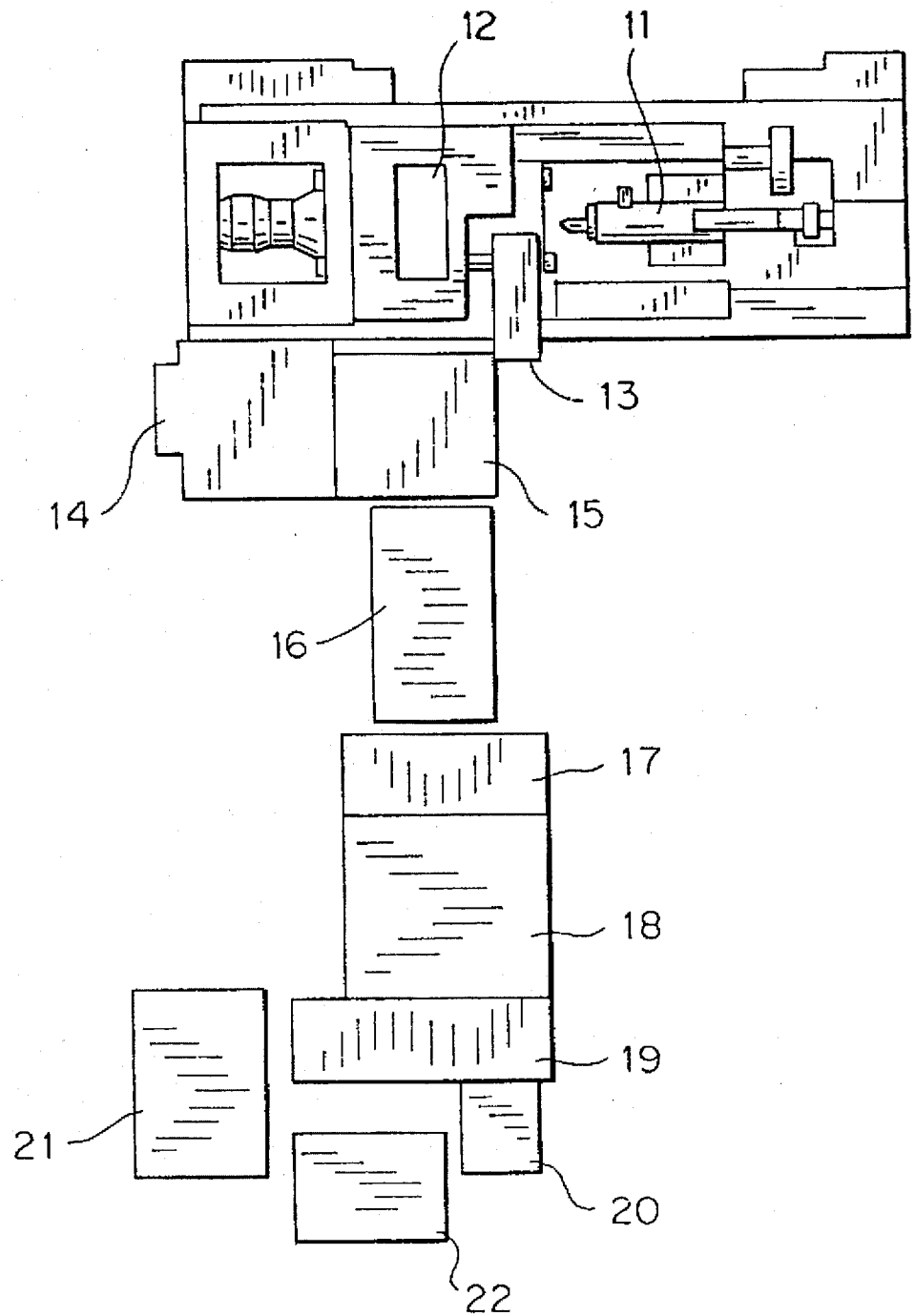
FIG. 1 is a top plan view of machines arranged in line for carrying out the present invention.
Figure 2:
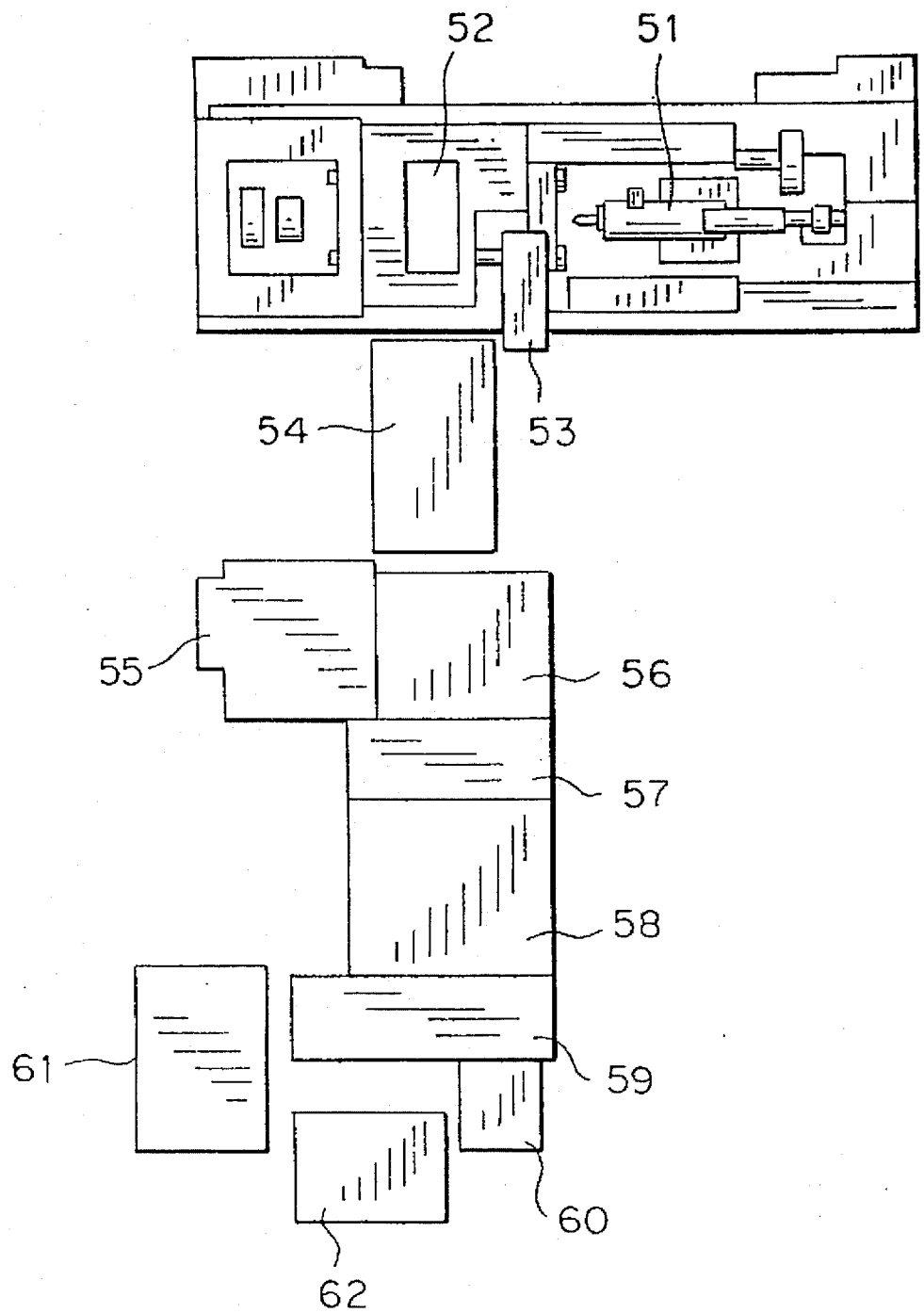
FIG. 2 is a top plan view of prior art machines arranged in line for producing discs.

The layout of the machines and devices in the invention is shown in FIG. 1. An injection molding machine 11 with mold 12 is installed at a predetermined position for injecting melted resin into a disc cavity of the mold to replicate pits of the information signals on the discs.

A removal robot 13 is mounted on the injection machine to take out the molded discs from mold 12 and to transfer them to a next-process position. A sputtering device 14 for sputtering metal onto the surface of the molded discs, by sputtering metal with the use of magnetron sputtering cathodes, is installed adjacent to the injection molding machine 11, whose operation is controlled by a control device 21.

A cooling station 16 is installed adjacent to a transferring unit 15 to forcefully and rapidly cool the discs sputtered with metal. A UV-sensitive resin coating device 17 is installed adjacent to the cooling station 16 to coat UV-sensitive resin on the metal surface of the discs. A UV ray applying device 18 is installed adjacent to the UV-sensitive resin coating device 17 to cure the UV resin coated on the discs by applying UV. A tester 19, with a control box 22, is installed adjacent to the UV-applying device 18 to detect faults such as bubbles, black spots, scratches or pin holes. Inspection is performed with scan cameras of the tester 19. Radial scans are made while the discs are rotated 360 degrees by a stepper motor. A stocker 20 is installed adjacent to the tester 19 to stock the discs that come up to standard without faults according to the decision based on inspection by the tester 19.

In the operation of the machines and devices in the above-mentioned layout of the invention, polycarbonate resin is preferably used as a molding material for the injection molding of the discs. It is plasticized under heat at 340°–360° C. and injected into the cavity of the mold 12 of the injection molding machine 11. The molded discs are retained in the mold 11 to be cooled for a predetermined number of seconds.

After a predetermined number of seconds, preferably a lapse of 2.5 seconds, the molded discs, whose temperature has fallen to about 130° C., are taken out by the robot 13. They are transferred to the sputtering device 14 by the transferring unit 15, but without forced cooling. There aluminum is metallized on the signal surface of the discs by sputtering.

It brings clouds and patches to the surface of the coated layer of the UV resin to coat UV resin on the metallized surface of the discs under such conditions that remaining heat of the metallized disc is still close to 50° C. So it is necessary, for preventing the above faults, to cool the discs before coating of UV resin.

Therefore, the metallized discs are first transferred to the cooling station 16 through the transferring unit 15 to be compulsively force-cooled to about 25° C. by the blower. Then the compulsively-cooled discs are transferred to the UV coating device 17, wherein UV resin lacquer is dropped on the metallized surfaces of the discs, which are spun at great speed, to be spread evenly on the metal layer due to centrifugal force. Being cured by the UV applying device 18, the discs, which have now finished all manufacturing processes, are then transferred to the tester 19 to detect the faults of the discs.

A decision on the quality of the discs is made by the tester 19. Then the stocker 20 stocks separately the normal discs and defective discs.

Figure 3:
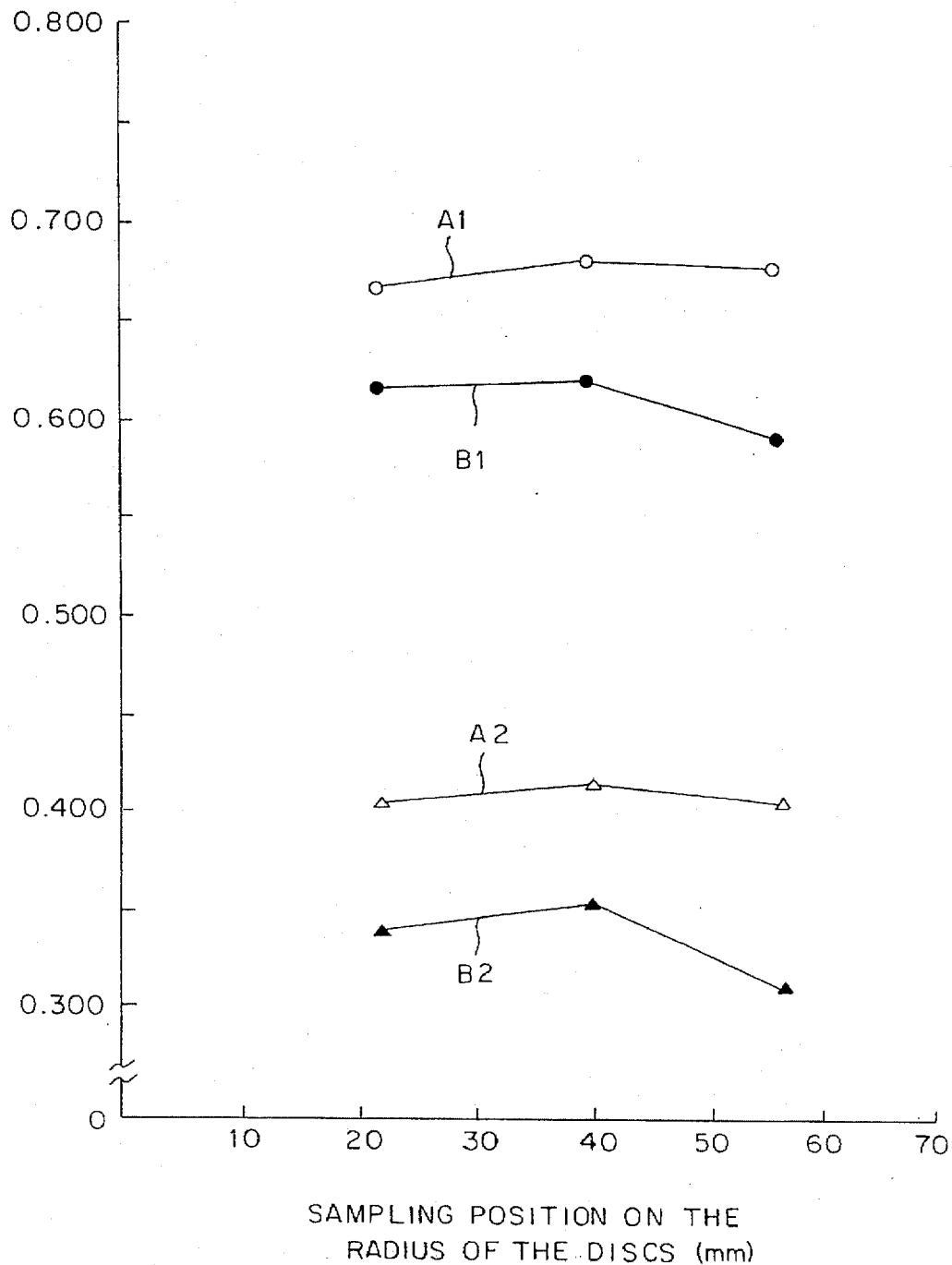
FIG. 3 is a graphical representation to compare the clearness of the replication of pits on the discs of the present invention and those of the prior art.

A comparison of disc replication results between the methods of the invention and the prior art, where the cooling time in the mold is 2.5 seconds, is shown in a graph of FIG. 3.

The following table shows examples of discs molded by the above two methods which were manufactured according to the prior art method and the method of the present invention:

TABLE

| STEPS | PRIOR ART | INVENTION |
| --- | --- | --- |
| i) Temperature on completion of cooling the discs in the mold | 130° C. | 130° C. |
| ii) Temperature on taking the discs out of the mold after 2.5 seconds | 110° C. | 110° C. |
| iii) Temperature just before starting sputtering of the discs | 30° C. (after compulsive cooling) | 90° C. (without compulsive cooling) |
| iv) Temperature just after sputtering the discs | 30° C. | 50° C. |
| v) Temperature just before coating UV resin on the metal of the discs | 25° C. (after spontaneous cooling) | 25° C. (after compulsive cooling) |

Material used for the molding was polycarbonate resin. The plasticizing temperature at which the polycarbonate was injected was 350° C. and the mold was kept at 90°C.

Details of measuring values representing clearness of pit replication on the molded discs are as follows;

The CD analyzer of a measuring device used for the present invention applies laser beams to the discs to measure the ray intensity reflected from the discs back to a linear camera array. It is capable of depicting the value of intensity in a graph. For measuring the value, the molded discs to be measured are set on the CD analyzer, then are rotated while laser beams are applied along a periphery at an arbitrary radius of the molded discs to measure the values of the ray intensity reflected from the measured discs back to the linear array of the camera.

Values representing clearness of pit replication on the molded discs are shown in the graph of FIG. 3. Lines A1, A2 and B1, B2 designate respectively the measured values of the molded discs of the present invention and of prior-art discs.

Numerous pits replicated on the molded discs are different in length and are located brokenly and spirally on the molded discs.

The values of A1 and B1 designate the ratios of the intensity of light reflected from the longest length information pit compared to the values of the intensity reflected from the flat surface of the molded discs. The values of A2 and B2 designate the ratios of the light intensity reflected from the shortest-length information pit divided by the value of the light intensity reflected from the flat surface parts. As can be seen, the values A1 and A2 according to the present invention are much improved over the prior art method where cooling in the mold is limited to 2.5 seconds to improve the rate of production.

As mentioned above, the present invention includes a novel method by which the replication of the pits on the molded discs is kept clear in spite of shortening the cooling time of the molded discs in the mold. The invention is capable of manufacturing excellent quality discs.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed:

1. An injection molding, sputtering, coating and curing process for manufacturing discs with information signals in a mold of an injection molding machine, said process for manufacturing the discs comprising the successive steps of:

injecting melted resin into a disc cavity of the mold to replicate information signal pits on a disc molded therein;

retaining the molded disc in the mold at the injection molding machine to cool for a predetermined number of seconds;

taking out the molded disc from the mold for immediate transfer to a metallizing device;

metallizing a surface of the molded disc in the metallizing device just after taking out the molded disc;

forcefully cooling the metallized disc to a predetermined temperature; and coating resin on the metallized surface of the molded disc cooled to the predetermined temperature;

whereby quality of the information signal pits is improved over another process with machine mold cooling for the predetermined number of seconds but without immediate transfer to the metallizing device.

2. The process according to claim 1, wherein the predetermined number of seconds for retaining the molded disc in the mold to cool is less than three seconds.

3. The process according to claim 1, wherein the predetermined number of seconds for retaining the molded disc in the mold to cool is approximately 2.5 seconds.

4. The process according to claim 1, wherein the metallizing device is a sputtering device and the step of metallizing includes sputtering.

5. The process according to claim 4, wherein a metallizing metal for sputtering on the discs is aluminum.

6. The process according to claim 1, further including a final step of curing the resin coated on the metallized surface.

7. The process according to claim 6, wherein the resin coated on the metallized surface of the discs is UV sensitive resin cured by application of UV rays and wherein the final step includes exposing the resin on the disc to the UV rays.

8. The process according to claim 1, wherein the predetermined temperature during the forceful cooling is about 25° C.

9. The process according to claim 1, wherein the step of metallizing is begun when surface of the molded disc is at a temperature approximately between 90 and 110 degrees centigrade.

* * * * *